US012562379B2

(12) United States Patent
Han et al.

(10) Patent No.: US 12,562,379 B2
(45) Date of Patent: Feb. 24, 2026

(54) PROCESSING FOR MAKING A PARTIALLY COATED ELECTRODE ACTIVE MATERIAL

(71) Applicant: BASF SE, Ludwigshafen am Rhein (DE)

(72) Inventors: Zhenji Han, Amagasaki (JP); Suhao Wei, Osaka (JP); Martin Schulz-Dobrick, Heidelberg (DE); Hitoshi Fukumitsu, Osaka (JP); Masatoshi Matsumoto, Tokyo (JP); Jumpei Nakayama, Yamaguchi (JP); Junji Kashiwagi, Yamaguchi (JP); Daisuke Morita, Yamaguchi (JP)

(73) Assignee: BASF SE, Ludwigshafen am Rhein (DE)

( * ) Notice: Subject to any disclaimer, the term of this patent is extended or adjusted under 35 U.S.C. 154(b) by 465 days.

(21) Appl. No.: 17/758,776

(22) PCT Filed: Mar. 5, 2021

(86) PCT No.: PCT/EP2021/055628
§ 371 (c)(1),
(2) Date: Jul. 13, 2022

(87) PCT Pub. No.: WO2021/180589
PCT Pub. Date: Sep. 16, 2021

(65) Prior Publication Data
US 2023/0060044 A1 Feb. 23, 2023

(30) Foreign Application Priority Data
Mar. 13, 2020 (EP) .................................... 20163067

(51) Int. Cl.
| | |
|---|---|
| *H01M 4/36* | (2006.01) |
| *C01G 53/50* | (2025.01) |
| *H01M 4/04* | (2006.01) |
| *H01M 4/505* | (2010.01) |
| *H01M 4/525* | (2010.01) |
| *H01M 4/02* | (2006.01) |

(52) U.S. Cl.
CPC ............ *H01M 4/366* (2013.01); *C01G 53/50* (2013.01); *H01M 4/0471* (2013.01); *H01M 4/505* (2013.01); *H01M 4/525* (2013.01); *C01P 2002/54* (2013.01); *C01P 2004/80* (2013.01); *C01P 2006/40* (2013.01); *H01M 2004/028* (2013.01)

(58) Field of Classification Search
CPC .................................................. H01M 4/0471
See application file for complete search history.

(56) References Cited

U.S. PATENT DOCUMENTS

| | | | | |
|---|---|---|---|---|
| 2007/0231694 A1* | 10/2007 | Abe | ....................... | C01G 53/42 429/231.1 |
| 2015/0162599 A1* | 6/2015 | Takei | .................. | H01M 50/434 252/519.15 |
| 2018/0047975 A1* | 2/2018 | Zhu | ....................... | H01M 4/525 |

FOREIGN PATENT DOCUMENTS

| | | | |
|---|---|---|---|
| JP | 2011-003354 | * | 1/2011 |

OTHER PUBLICATIONS

Machine translation of document N.*
International Search Report dated May 26, 2021, PCT/EP2021/055628.

* cited by examiner

*Primary Examiner* — Austin Murata
(74) *Attorney, Agent, or Firm* — Armstrong Teasdale LLP

(57) ABSTRACT

Process for making a partially coated electrode active material wherein said process comprises the following steps: (a) Providing an electrode active material according to general formula $Li_{1+x}TM_{1-x}O_2$, wherein TM is Ni and, optionally, at least one of Co and Mn, and, optionally, at least one element selected from Al, Mg, and Ba, transition metals other than Ni, Co, and Mn, and x is in the range of from zero to 0.2, wherein at least 50 mole-% of the transition metal of TM is Ni, (b) treating said electrode active material with an aqueous medium, (c) partially removing water by solid-liquid separation method, (d) treating the solid residue with an aqueous formulation of at least one heteropolyacid or its respective ammonium or lithium salt, (e) treating the residue thermally.

12 Claims, No Drawings

PROCESSING FOR MAKING A PARTIALLY COATED ELECTRODE ACTIVE MATERIAL

This application is a national stage filing under 35 U.S.C. § 371 of International Application No. PCT/EP2021/055628, filed on Mar. 5, 2021, which claims priority to EP Application No. 201630673.0, filed on Mar. 13, 2020; the contents of each are incorporated herein by reference in their entirety.

The present invention is directed towards a process for making a partially coated electrode active material wherein said process comprises the following steps:

(a) Providing an electrode active material according to general formula $Li_{1+x}TM_{1-x}O_2$, wherein TM is Ni and, optionally, at least one of Co and Mn, and, optionally, at least one element selected from Al, Mg, and Ba, transition metals other than Ni, Co, and Mn, and x is in the range of from zero to 0.2, wherein at least 50 mole-% of the transition metal of TM is Ni, (b) treating said electrode active material with an aqueous medium, (c) partially removing water by solid-liquid separation method, (d) treating the solid residue with an aqueous formulation of at least one heteropoly acid or its respective ammonium or lithium salt, (e) treating the residue thermally.

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

Currently, a certain interest in so-called Ni-rich electrode active materials may be observed, for example electrode active materials that contain 75 mole-% or more of Ni, referring to the total TM content.

One problem of lithium ion batteries—especially of Ni-rich electrode active materials—is attributed to undesired reactions on the surface of the electrode active materials. Such reactions may be a decomposition of the electrolyte or the solvent or both. It has thus been tried to protect the surface without hindering the lithium exchange during charging and discharging. Examples are attempts to coat the electrode active materials with, e.g., aluminium oxide or calcium oxide, see, e.g., U.S. Pat. No. 8,993,051.

Other theories assign undesired reactions to free LiOH or $Li_2CO_3$ on the surface. Attempts have been made to remove such free LiOH or $Li_2CO_3$ by washing the electrode active material with water, see, e.g., JP 4,789,066 B, JP 5,139,024 B, and US2015/0372300. However, in some instances it was observed that the properties of the resultant electrode active materials did not improve.

It was an objective of the present invention to provide a process for making Ni-rich electrode active materials with excellent electrochemical properties. It was also an objective to provide Ni-rich electrode active materials with excellent electrochemical properties.

Accordingly, the process defined at the outset has been found, hereinafter also referred to as "inventive process". The inventive process comprises the following steps:

(a) Providing an electrode active material according to general formula $Li_{1+x}TM_{1-x}O_2$, wherein TM is Ni and, optionally, at least one of Co and Mn, and, optionally, at least one element selected from Al, Mg, and Ba, transition metals other than Ni, Co, and Mn, and x is in the range of from zero to 0.2, wherein at least 50 mole-% of the transition metal of TM is Ni, (b) treating said electrode active material with an aqueous medium, (c) partially removing water by solid-liquid separation method, (d) treating the solid residue with an aqueous formulation of at least one heteropoly acid or its respective ammonium or lithium salt, (e) treating the residue thermally.

The inventive process comprises five steps, (a), (b), (c), (d), and (e), in the context of the present invention also referred to as step (a) and step (b) and step (c) and step (d) and step (e), respectively. Steps (b) and (c) may be commenced simultaneously or preferably subsequently. Steps (b) and (c) may be performed simultaneously or subsequently or, preferably, at least partially overlapping or simultaneously. Step (d) is performed after completion of step (c).

The inventive process starts off from an electrode active material according to general formula $Li_{1+x}TM_{1-x}O_2$, wherein TM comprises Ni and, optionally, at least one transition metal selected from Co and Mn, and, optionally, at least one element selected from Al, Mg and Ba, and, wherein at least 50 mole-% of TM is Ni, preferably at least 75 mole-%, and x is in the range of from −0.05 to 0.2. Said material is hereinafter also referred to as starting material.

In one embodiment of the present invention the starting material has an average particle diameter (D50) in the range of from 3 to 20 μm, preferably from 5 to 16 μm. The average particle diameter can be determined, e. g., by light scattering or LASER diffraction or electroacoustic spectroscopy. The particles are usually composed of agglomerates from primary particles, and the above particle diameter refers to the secondary particle diameter.

In one embodiment of the present invention, the starting material has a specific surface (BET), hereinafter also referred to as "BET surface", in the range of from 0.1 to 2.0 m²/g. The BET surface may be determined by nitrogen adsorption after outgassing of the sample at 200° C. for 30 minutes or more and beyond this accordance with DIN ISO 9277:2010.

In one embodiment of the present invention, the particulate material provided in step (a) has a moisture content in the range of from 20 to 2,000 ppm, determined by Karl-Fischer titration, preferred are 50 to 1,200 ppm.

In one embodiment of the present invention, the variable TM corresponds to general formula (I)

$$(Ni_aCo_bMn_c)_{1-d}M^1_d \qquad (I)$$

with a+b+c=1 and a being in the range of from 0.6 to 0.99, preferably from 0.75 to 0.95, more preferably from 0.85 to 0.95, b being in the range of from zero or 0.01 to 0.2, preferably from 0.025 to 0.2, more preferably from 0.025 to 0.1, c being in the range of from zero to 0.2, preferably from 0.025 to 0.2, more preferably from 0.05 to 0.1, d being in the range of from zero to 0.1, preferably from zero to 0.04, $M^1$ is at least one of Al, Mg, Ti, Nb, Mo, W and Zr, preferably at least one of Al, Ti, Zr and W.

In one embodiment of the present invention, the variable c is zero, $M^1$ is Al, and d is in the range of from 0.01 to 0.05.

In another embodiment of the present invention, the variable TM corresponds to general formula (I a)

$$(Ni_a-Co_b-Al_e-)_{1-d}-M^2{}_d (I\ a)$$

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

The variable x is in the range of from −0.05 to 0.2.

In one embodiment of the present invention TM corresponds to general formula (I a) and x is in the range from zero to 0.2, preferably from zero to 0.1 and even more preferably 0.01 to 0.05.

In one embodiment of the present invention TM corresponds to general formula (I b) and x is in the range of from −0.05 to zero.

In one embodiment of the present invention, TM is selected from $Ni_{0.60}Co_{0.2}Mn_{0.2}$, $Ni_{0.70}Co_{0.2}Mn_{0.1}$, $Ni_{0.8}Co_{0.1}Mn_{0.1}$, $Ni_{0.83}Co_{0.12}Mn_{0.05}$, $Ni_{0.89}Co_{0.055}Al_{0.055}$, $Ni_{0.9}Co_{0.045}Al_{0.45}$ and $Ni_{0.85}Co_{0.1}Mn_{0.05}$.

The electrode active material provided in step (a) is usually free from conductive carbon, that means that the conductive carbon content of starting material is less than 1% by weight, referring to said starting material, preferably 0.001 to 1.0% by weight.

Some elements are ubiquitous. In the context of the present invention, traces of ubiquitous metals such as sodium, calcium, iron or zinc, as impurities will not be taken into account in the description of the present invention. Traces in this context will mean amounts of 0.02 mol-% or less, referring to the total metal content of the starting material.

In step (b), said electrode active material provided in step (a) is treated with an aqueous medium, preferably with water. Said aqueous medium may have a pH value in the range of from 2 up to 14, preferably at least 3.5, more preferably from 5 to 7. The pH value is measured at the beginning of step (b). It is observed that in the course of step (b), the pH value raises to at least 10, for example 11 to 13. In embodiments wherein the pH value is in the range of from 10 to 11 at the beginning of step (b) it raises to more than 11 to up to 13. In embodiments wherein the pH value is in the range of 3 to below 10 at the beginning of step (b) it raises to 11 to up to 13 in the course of step (b).

It is preferred that the water hardness of said aqueous formulation used in step (b) is at least partially removed, especially calcium. The use of desalinized water is preferred.

In one embodiment of the present invention, step (b) is performed at a temperature in the range of from 5 to 85° C., preferred are 10 to 60° C.

In one embodiment of the present invention, step (b) is performed at normal pressure. It is preferred, though, to perform step (b) under elevated pressure, for example at 10 mbar to 10 bar above normal pressure, or with suction, for example 50 to 250 mbar below normal pressure, preferably 100 to 200 mbar below normal pressure.

Step (b) may be performed, for example, in a vessel that can be easily discharged, for example due to its location above a filter device. Such vessel may be charged with starting material followed by introduction of aqueous medium. In another embodiment, such vessel is charged with aqueous medium followed by introduction of starting material. In another embodiment, starting material and aqueous medium are introduced simultaneously.

In one embodiment of the present invention, in step (b), the amounts of water and electrode active material have a weight ratio in the range of from 1:5 to 5:1, preferably from 2:1 to 1:2.

Step (b) may be supported by mixing operations, for example shaking or in particular by stirring or shearing, see below.

In one embodiment of the present invention, step (b) has a duration in the range of from 1 minute to 60 minutes, preferably 1 minute to less than 30 minutes. A duration of 5 minutes or more is possible in embodiments wherein in step (b), water treatment and water removal are performed overlapping or simultaneously.

In one embodiment of the present invention, treatment according to step (b) and water removal according to step (c) are performed consecutively.

After or during the treatment with an aqueous medium in accordance to step (b), water may be removed by any type of filtration, for example on a band filter or in a filter press.

In one embodiment of the present invention, at the latest 3 minutes after commencement of step (b), step (c) is started. Step (c) includes partially removing the water from treated particulate material, for example by way of a solid-liquid separation, for example by decanting or preferably by filtration. Said "partial removal" may also be referred to as partially separating off.

In one embodiment of step (c), the slurry obtained in step (b) is discharged directly into a centrifuge, for example a decanter centrifuge or a filter centrifuge, or on a filter device, for example a suction filter or in a belt filter that is located preferably directly below the vessel in which step (b) is performed. Then, filtration is commenced.

In a particularly preferred embodiment of the present invention, steps (b) and (c) are performed in a filter device with stirrer, for example a pressure filter with stirrer or a suction filter with stirrer. At most 3 minutes after—or even immediately after—having combined starting material and aqueous medium in accordance with step (b), removal of aqueous medium is commenced by starting the filtration. On laboratory scale, steps (b) and (c) may be performed on a Buchner funnel, and steps (b) and (c) may be supported by manual stirring.

In a preferred embodiment, step (b) is performed in a filter device, for example a stirred filter device that allows stirring of the slurry in the filter or of the filter cake.

In one embodiment of the present invention, the water removal in accordance to step (c) has a duration in the range of from 1 minute to 1 hour.

In one embodiment of the present invention, stirring in step (b)—and (c), if applicable—is performed with a rate in the range of from 1 to 50 revolutions per minute ("rpm"), preferred are 5 to 20 rpm.

In one embodiment of the present invention, filter media may be selected from ceramics, sintered glass, sintered metals, organic polymer films, non-wovens, and fabrics.

In one embodiment of the present invention, steps (b) and (c) are carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform steps (b) and (c) under an atmosphere with a carbon dioxide content below detection limit for example with infra-red-light based optical methods.

From step (c), a residue is obtained, preferably, in the form of a wet filter cake. The moisture content of the filter cake may be in the range of from 3 to 20% by weight, preferably 4 to 9% by weight.

In step (d), the solid residue from step (c) is treated with an aqueous formulation of at least one heteropoly acid or its respective ammonium or lithium salt.

In one embodiment of the present invention, heteropoly acid used in step (d) is selected from phosphotungstic acid, phosphomolybdic acid, tungstosilicic acid, molybdosilicic acid and combinations of at least two of the foregoing, and their respective ammonium and lithium salts, for example the mono-, di- or triammonium salts and the mono-, di- and trilithium salts. Preferred are heteropoly acids of tungsten, especially phosphotungstic acid and tungstosilicic acid and their respective ammonium and lithium salts, for example the mono-, di- or triammonium salts.

Specific examples of compounds are $M^2_9[(W_9O_{34})$, $M^2_6$ $(P_2W_{21}O_{71})$, $M^2_3(PW_{12}O_{40})$, $M^2_4(SiW_{12}O_{40})$, $M^2_6$ $(P_2W_{18}O_{62})$; $M^2_7(PW_{11}O_{39})$, and $M^2_{10}(SiW_9O_{34})$, with $M^2$ being selected from H and ammonium and combinations thereof.

In one embodiment of the present invention, the amount of heteropoly acid is in the range of from 0.05 to 1.5 mol-%, preferably 0.2 to 0.9 mol-%, referring to TM.

Said aqueous formulation may have a pH value in the range of from 2 up to 14, preferably at least 3.5, more preferably from 5 to 11.

In one embodiment of the present invention, the pH value of the aqueous formulation used in step (d) is controlled by the addition of a basic Li compound, especially of LiOH.

The pH value—if applicable—is measured at the beginning of step (d). Depending on the order of addition of electrode active material, water and heteropoly acid it is observed that in the course of step (d), the pH value may raise to at least 10, for example 11 to 14. In embodiments wherein the pH value is in the range of from 10 to 11 at the beginning of step (d) it raises to more than 11 to up to 14. In embodiments wherein the pH value is in the range of 3 to below 10 at the beginning of step (d) it raises to 11 to up to 14. It is preferred that the water hardness of said aqueous formulation used in step (d) is at least partially removed, especially calcium. The use of desalinized water is preferred.

The treatment in step (d) may be performed by adding heteropoly acid to the moisture-containing residue of step (c) and allowing the resultant mixture to interact. Such interaction may be enhanced by mixing, stirring, or shaking.

In one embodiment of the present invention, step (d) is performed at a temperature in the range of from 5 to 85° C., preferred are 10 to 60° C. Ambient temperature is particularly preferred.

In one embodiment of the present invention, step (d) is performed at normal pressure. It is preferred, though, to perform step (d) under elevated pressure, for example at 10 mbar to 10 bar above normal pressure, or with suction, for example 50 to 250 mbar below normal pressure, preferably 100 to 200 mbar below normal pressure.

In one embodiment of the present invention, step (d) is performed in a filter device with stirrer, for example a pressure filter with stirrer or a suction filter with stirrer.

The time of treatment of the residue of step (c) with heteropoly acid may be in the range of from 2 to 30 minutes.

In one embodiment of the present invention, steps (b) to (d) are performed in the same vessel, for example in a filter device with stirrer, for example a pressure filter with stirrer or a suction filter with stirrer.

The inventive process includes a subsequent step (e):

(e) thermal treatment of the material obtained from step (d).

Step (e) may be carried out in any type of oven, for example a roller hearth kiln, a pusher kiln, a rotary kiln, a pendulum kiln, or—for lab scale trials—in a muffle oven.

The temperature of the thermal treatment according to step (e) may be in the range of from 150 to 900° C., preferably 150 to 700° C. and even more preferably from 175 to 650° C. Said temperature refers to the maximum temperature of step (e).

It is possible to subject the material obtained from step (d) directly to step (e). However, it is preferred to increase the temperature stepwise, or to ramp up the temperature, or to dry the material obtained after step (d) at first at a temperature in the range of from 40 to 100° C. before subjecting it to step (e), or to remove water by a solid-liquid separation method such as filtration.

Said step-wise increase or ramping up may be performed under normal pressure or reduced pressure, for example 0.1 to 500 mbar.

Step (e)—at its maximum temperature—may be performed under normal pressure.

In one embodiment of the present invention, step (e) is carried out under an oxygen-containing atmosphere, for example air, oxygen-enriched air or pure oxygen.

In embodiments wherein a drying at a temperature in the range of from 100 to 250° C. prior to step (e) is performed such drying may be performed with a duration of from 10 minutes to 5 hours.

In one embodiment of the present invention, step (e) is carried out under an atmosphere with reduced $CO_2$ content, e.g., a carbon dioxide content in the range of from 0.01 to 500 ppm by weight, preferred are 0.1 to 50 ppm by weight. The $CO_2$ content may be determined by, e.g., optical methods using infrared light. It is even more preferred to perform step (e) under an atmosphere with a carbon dioxide content below detection limit for example with infrared-light based optical methods.

In one embodiment of the present invention step (e) has a duration in the range of from 1 to 10 hours, preferably 90 minutes to 6 hours.

In one embodiment of the present invention, the lithium content of an electrode active material is reduced by 0.4 to 5% by weight, preferably 0.5 to 2%. Said reduction mainly affects the so-called residual lithium.

By carrying out the inventive process, electrode active materials are obtained with excellent electrochemical properties. Without wishing to be bound by any theory, we assume that the decomposition products of heteropoly acid may lead to scavenging lithium compounds deposited at the surface of the electrode active material.

Without wishing to be bound by any theory, we assume that the surface of the electrode active material is less negatively influenced by the inventive process than by washing processes without heteropoly acid addition.

Further disclosed are electrode active materials, hereinafter also referred to as electrode active material obtained according to the inventive process. Such electrode active material is in particulate form and has the general formula $Li_{1+1}TM_{1-x}O_2$, wherein TM is a combination of Ni, Co and, optionally, Mn, and, optionally, at least one element selected from Al, Mg, and Ba, transition metals other than Ni, Co, and Mn, and x is in the range of from zero to 0.2, wherein at least 60 mole-% of the transition metal of TM is Ni, wherein the outer surface of said particles is coated with a combination of an oxide of tungsten or molybdenum and with a phosphate or silicate. Out of W and Mo, W is preferred.

In one embodiment of the present invention, the molar ratio of W to phosphate or silicate on the outer surface is in the range of from 1:9 to 1:15. Preferably, it is 1:12.

In one embodiment of the present invention, such oxide of tungsten or molybdenum is selected from $WO_3$, $MoO_3$, $Li_2WO_4$, $Li_2MoO_4$, $Li_4WO_5$, $Li_4MoO_5$, and from combinations of at least two of the respective W or Mo species.

In one embodiment of the present invention, phosphates and silicates are selected from $Li_3PO_4$, $Li_4P_2O_7$, $LiPO_3$, $SiO_2$, and $Li_4SiO_4$. Further examples are $Li_9[(W_9O_{34})]$, $Li_6(P_2W_{21}O_{71})$, $Li_6(P_2W_{18}O_{62})$; $Li_7(PW_{11}O_{39})$, and $Li_{10}(SiW_9O_{34})$.

In one embodiment of the present invention, the outer surface of said particles is uniformly coated with a combination of an oxide of tungsten or molybdenum and with phosphate or silicate, and wherein the coating is uniform as detected by EDX mapping ("energy dispersive X-ray mapping).

Such coating is uniform. That means that in TEM-(transmission electron microscopy)-EDX, oxide of W or Mo and phosphate or silicate, respectively, appear to be evenly distributed over the surface of the primary and secondary particles.

In one embodiment of the present invention, the variable TM corresponds to general formula (I a)

$$(Ni_aCo_bMn_c)_{1-d}M^1_d \qquad (I\ a)$$

with a+b+c=1 and a being in the range of from 0.6 to 0.99, preferably from 0.75 to 0.95, more preferably from 0.85 to 0.95, b being zero or in the range of from 0.01 to 0.2, preferably from 0.025 to 0.2, more preferably from 0.025 to 0.1, c being in the range of from zero to 0.2, preferably from 0.025 to 0.2, more preferably from 0.05 to 0.1, d being in the range of from zero to 0.1, preferably from zero to 0.04, $M^1$ is at least one of Al, Mg, Ti, Nb, Mo, W and Zr, preferably at least one of Al, Ti, Zr and W.

In one embodiment of the present invention, the variable c is zero, $M^1$ is Al, and d is in the range of from 0.01 to 0.05.

In another embodiment of the present invention, the variable TM corresponds to general formula (I b)

$$(Ni_a—Co_b—Al_e—)_{1-d}M^2_d \qquad (I\ b)$$

with a*+b*+c*=1 and a* being in the range of from 0.75 to 0.95, preferably from 0.88 to 0.95, b* being in the range of from 0.025 to 0.2, preferably from 0.025 to 0.1, e* being in the range of from 0.01 to 0.2, preferably from 0.015 to 0.04, d* being in the range of from zero to 0.1, preferably from zero to 0.02, $M^2$ is at least one of W, Mo, Ti or Zr.

The variable x is in the range of from −0.05 to 0.2.

In one embodiment of the present invention TM corresponds to general formula (I a) and x is in the range from zero to 0.2, preferably from zero to 0.1 and even more preferably 0.01 to 0.05.

In one embodiment of the present invention TM corresponds to general formula (I b) and x is in the range of from −0.05 to zero.

In one embodiment of the present invention electrode active materials made according to the inventive process have an average particle diameter (D50) in the range of from 3 to 20 μm, preferably from 5 to 16 μm. The average particle diameter may be determined, e. g., by light scattering or LASER diffraction or electroacoustic spectroscopy. The particles are usually composed of agglomerates from primary particles, and the above particle diameter refers to the secondary particle diameter.

In one embodiment of the present invention such electrode active materials have a surface (BET) in the range of from 0.1 to 2.0 $m^2/g$, determined according to DIN-ISO 9277:2003-05.

Electrode active materials made according to the present invention may be used as component of electrodes. They are particularly useful for lithium ion batteries. Lithium ion batteries comprising at least one electrode in accordance with the present invention exhibit a good discharge behavior. Electrodes comprising at least one electrode active material according to the present invention are hereinafter also referred to as inventive cathodes or cathodes according to the present invention.

Cathodes according to the present invention can comprise further components. They can comprise a current collector, such as, but not limited to, an aluminum foil. They can further comprise conductive carbon and a binder.

Suitable binders are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopoly-ethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homo-polypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and $\alpha$-methylstyrene.

Another preferred binder is polybutadiene.

Other suitable binders are selected from polyethylene oxide (PEO), cellulose, carboxymethyl-cellulose, polyimides and polyvinyl alcohol.

In one embodiment of the present invention, binder is selected from those (co)polymers which have an average molecular weight M, in the range from 50,000 to 1,000,000 g/mol, preferably to 500,000 g/mol.

Binder may be cross-linked or non-cross-linked (co) polymers.

In a particularly preferred embodiment of the present invention, binder is selected from halogenated (co)polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive cathodes may comprise 1 to 15% by weight of binder(s), referring to electrode active material. In other embodiments, inventive cathodes may comprise 0.1 up to less than 1% by weight of binder(s).

A further aspect of the present invention is a battery, containing at least one cathode comprising inventive electrode active material, carbon, and binder, at least one anode, and at least one electrolyte.

Embodiments of inventive cathodes have been described above in detail.

Said anode may contain at least one anode active material, such as carbon (graphite), $TiO_2$, lithium titanium oxide, silicon or tin. Said anode may additionally contain a current collector, for example a metal foil such as a copper foil.

Said electrolyte may comprise at least one non-aqueous solvent, at least one electrolyte salt and, optionally, additives.

Non-aqueous solvents for electrolytes can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight M, of suitable polyalkylene glycols and in particular suitable polyethylene glycols can be at least 400 g/mol.

The molecular weight Mdw of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds according to the general formulae (II) and (Ill)

$$\text{(II)}$$

$$\text{(III)}$$

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

$$\text{(IV)}$$

The solvent or solvents is/are preferably used in the water-free state, i.e. with a water content in the range from 1 ppm to 0.1% by weight, which can be determined, for example, by Karl-Fischer titration.

Electrolyte (C) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

t=1, when Y is selected from among oxygen and sulfur, t=2, when Y is selected from among nitrogen and phosphorus, and t=3, when Y is selected from among carbon and silicon.

Preferred electrolyte salts are selected from among LiC $(CF_3SO_2)_3$, $LiN(CF_3SO_2)_2$, $LiPF_6$, $LiBF_4$, $LiClO_4$, with particular preference being given to $LiPF_6$ and LiN $(CF_3SO_2)_2$.

In an embodiment of the present invention, batteries according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene. Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have porosities in the range from 40 to 55%. Suitable pore diameters are, for example, in the range from 80 to 750 nm.

Batteries according to the invention further comprise a housing which can have any shape, for example cuboidal or the shape of a cylindrical disk or a cylindrical can. In one variant, a metal foil configured as a pouch is used as housing.

Batteries according to the invention display a good discharge behavior, for example at low temperatures (zero ° C. or below, for example down to −10° C. or even less), a very good discharge and cycling behavior.

Batteries according to the invention can comprise two or more electrochemical cells that combined with one another, for example can be connected in series or connected in parallel. Connection in series is preferred. In batteries according to the present invention, at least one of the electrochemical cells contains at least one cathode according to the invention. Preferably, in electrochemical cells according to the invention, the majority of the electrochemical cells contains a cathode according to the present invention. Even more preferably, in batteries according to the present invention all the electrochemical cells contain cathodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by the following working examples.

General remarks: N-methyl-2-pyrrolidone: NMP.

Ultra-dry air: dehumidified air, dew point of less than −30° C., and $CO_2$ content less than 50 ppm $H_3(PW_{12}O_{40})$-$nH_2O$ (n=30) was dissolved in an aqueous solution of LiOH. The molar ratio of Li/W was 2:1 (mol/mol). The resulting solution is named "$PW_{12}$+LiOH aq".

$H_4(SiW_{12}O_{40})$-$nH_2O$ (n=30) was dissolved in an aqueous solution of LiOH. The molar ratio of Li/W was 2:1 (mol/mol). The resulting solution is named "$SiW_{12}$+LiOH aq".

I. Synthesis of a Cathode Active Material

I.1 Synthesis of a Precursor TM-OH.1

A stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution at a flow rate ratio of 1.8, and a total flow rate resulting in a residence time of 8 hours. The transition metal solution contained Ni, Co and Mn at a molar ratio of 8.5:1.0:0.5 and a total transition metal concentration of 1.65 mol/kg.

The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, mother liquor was removed continuously. After 33 hours all feed flows were stopped. The mixed transition metal (TM) hydroxide precursor TM-OH.1 was obtained by filtration of the resulting suspension, washing with distilled water, drying at 120° C. in air and sieving.

I.2 Conversion of TM-OH.1 into Cathode Active Materials

I.2.1 Manufacture of a Base Cathode Active Material, B-CAM.1, Step (a.1)

B-CAM.1 (base): The mixed transition metal hydroxide precursor TM-OH.1 was mixed with $Al_2O_3$ (average particle diameter 6 nm) to obtain a concentration of 0.3 mole-% Al relative to Ni+Co+Mn+Al and LiOH monohydrate to obtain a Li/(TM+Al) molar ratio of 1.06. The mixture was heated to 760° C. and kept for 10 hours in a forced flow of a mixture of 80% oxygen and 20% nitrogen (by volume). After cooling to ambient temperature the powder was deagglomerat-ed and sieved through a 32 μm mesh to obtain the base cathode active material C-CAM 1.

D50=9.0 μm determined using the technique of laser diffraction in a Mastersize 3000 instru-ment from Malvern Instruments. The Al-content was determined by ICP analyt-ics and corre-sponded to 780 ppm. Residual moisture at 250° C. was determined to be 300 ppm. PS I.2.2 Manufacture of a Comparative Cathode Active Material, Steps (b.1) to (e.1)

Step (b.1): A beaker was charged with 67 ml of de-ionized water. An amount of 100 g C-CAM.1 was added. The resultant slurry was stirred at ambient temperature over a period of 5 minutes, during said stirring the slurry temperature was maintained at 25° C.

Step (c.1): Then, the water was removed by filtration through a filter press. A wet filter cake re-mained.

Step (e.1): The resultant filter cake was dried in ultra-dry air at 70° C. for 2 hours and then at 185° C. over a period of 10 hours. Then, by sieving obtained powder with 45 μm sieve, cathode active material C-CAM.1 was obtained.

1.2.3 Synthesis of Inventive Cathode Active Materials, Example of CAM.2

Steps (a.1) to steps (c.1) were performed as above.

Step (d.2): An amount of 2.17 g of $PW_{12}$+LiOH aq. was added to the wet filter cake resulting from step (c.1). The molar ratio of $PW_{12}$/(TM) was 0.000125

(W/TM=0.0015). The wet filter cake with $PW_{12}$ aq was passed into a plastic bag and scrambled for 5 minutes at ambient temperature.

Step (e.2): The resultant filter cake was dried in ultra-dry air at 70° C. for 2 hours and then at 185° C. over a period of 10 hours. Then, by sieving obtained powder with 45 μm sieve, inventive cathode active material CAM.2 was obtained.

Further inventive cathode active materials were made accordingly, by modifying the amount of $PW_{12}$+LiOH aq or introducing $SiW_{12}$+LiOH aq in addition to or instead of $PW_{12}$+LiOH aq. The results are summarized in Table 1.

II. Testing of Cathode Active Material

II.1 Electrode Manufacture, General Procedure

Positive electrode: PVDF binder (Solef®5130) was dissolved in NMP (Merck) to produce a 8.0 wt. % solution. For electrode preparation, binder solution (4 wt. %), and carbon black (Li250, 3.5 wt.-%) were suspended in NMP. After mixing using a planetary centrifugal mixer (ARE-250, Thinky Corp.; Japan), either any of inventive CAM.2 to CAM.7 or a base cathode active material C-CAM.1, (92.5 wt. %) was added and the suspension was mixed again to obtain a lump-free slurry. The solid content of the slurry was adjusted to 65%. The slurry was coated onto Al foil using a KTF-S roll-to-roll coater (Mathis AG). Prior to use, all electrodes were calendared. The thickness of cathode material was 70 μm, corresponding to 15 mg/cm². All electrodes were dried at 120° C. for 7 hours before battery assembly.

II.2 Electrolyte Manufacture

A base electrolyte composition was prepared containing 12.7 wt % of $LiPF_6$, 26.2 wt % of ethylene carbonate (EC), and 61.1 wt % of ethyl methyl carbonate (EMC) (EL base 1), based on the total weight of EL base 1. To this base electrolyte formulation 2 wt. % of vinylene carbonate (VC) was added (EL base 2).

II.3 Test Cell Manufacture

II.3.1 Coin-Type Half Cells

Coin-type half cells (20 mm in diameter and 3.2 mm in thickness) comprising a cathode prepared as described under 111.1.1 and lithium metal as working and counter electrode, respectively, were assembled and sealed in an Ar-filled glove box. In addition, the cathode and anode and a separator were superposed in order of cathode//separator//Li foil to produce a half coin cell. Thereafter, 0.15 mL of the EL base 1 which is described above (111.2) were introduced into the coin cell.

III. Evaluation of Coin Half-Cell Performance

Cell performance were evaluated using the produced coin type battery. For the battery performances, initial capacity and reaction resistance of cell were measured. The initial performance and cycle were measured as follows: Coin half cells according to 11.3.1 were tested in a voltage range between 4.3 V to 2.8 V at room temperature. For the initial cycles, the initial lithiation was conducted in the CC-CV mode, i.e., a constant current (CC) of 0.1 C was applied until reaching 0.01 C. After 10 min resting time, reductive lithiation was carried out at constant current of 0.1 C up to 2.8 V. For the cycling, the current density is 0.1 C. The results are summarized in Table 2.

The cell reaction resistance was calculated by the following method: After the evaluation of the initial performance, the coin cells are recharged to 4.3V, and the resistance is measured by the electrochemical impedance spectroscopy (EIS) method using potentiostat and frequency response analyzer system (Solartron CellTest System 1470E). From the EIS spectra, Ohmic resistance and reactive resistance were obtained. The results are summarized in Table 1. [%] relative resistance is based on the resistance of cell based on C-CAM.1 as 100%.

TABLE 1

Manufacturing details and composition of CAM

| CAM | $PW_{12}$ + LiOH aq or $SiW_{12}$ + LiOH aq | [mol %] w.r.t. TM | step (e), drying, [° C.] | step (e) calcination, [° C.] |
|---|---|---|---|---|
| C-CAM.1 | none | Zero | 185 | none |
| CAM.2 | $PW_{12}$ + LiOH aq | 0.3 | 185 | none |
| CAM.3 | $PW_{12}$ + LiOH aq | 0.6 | 185 | none |
| CAM.4 | $PW_{12}$ + LiOH aq | 0.9 | 185 | none |
| CAM.5 | $SiW_{12}$ + LiOH aq | 0.15 | 185 | none |
| CAM.6 | $SiW_{12}$ + LiOH aq | 0.3 | 185 | none |
| CAM.7 | $PW_{12}$ + LiOH aq | 0.6 | 185 | 300 |
| CAM.8 | $PW_{12}$ + LiOH aq | 0.6 | 185 | 400 |
| CAM.9 | $PW_{12}$ + LiOH aq | 0.6 | 185 | 500 |
| CAM.10 | $PW_{12}$ + LiOH aq + $SiW_{12}$ + LiOH aq | 0.3 + 0.3 | 185 | none |
| CAM.11 | $PW_{12}$ + LiOH aq + $SiW_{12}$ + LiOH aq | 0.3 + 0.3 | 185 | 400 |
| CAM.12 | $PW_{12}$ aq | 0.3 | 185 | none |
| CAM.13 | $SiW_{12}$ aq | 0.15 | 185 | none | w.r.t.: with respect to

TABLE 2

Initial charge and discharge capacity with initial reaction resistance, coin cell

| CAM | $1^{st}$ charge capacity [mA · h/g] | $1^{st}$ discharge capacity [mA · h/g] | Coulombic efficiency [%] | Relative R (resistance) $2^{nd}$ cycle [%] |
|---|---|---|---|---|
| C-CAM.1 | 232 | 209.0 | 90 | 100 |
| CAM.2 | 231 | 211 | 91 | 26 |
| CAM.3 | 228 | 207 | 91 | 34 |
| CAM.4 | 227 | 206 | 91 | 22 |
| CAM.5 | 231 | 211 | 91 | 36 |
| CAM.6 | 230 | 209 | 91 | 43 |
| CAM.7 | 234 | 216 | 92 | 30 |
| CAM.8 | 232 | 215 | 93 | 61 |
| CAM.9 | 230 | 213 | 93 | 14 |
| CAM.10 | 231 | 210 | 91 | 19 |
| CAM.12 | 229 | 206 | 90 | 21 |
| CAM.13 | 229 | 209 | 91 | 42 |

The invention claimed is:

1. A process for making a partially coated electrode active material comprising:
   (a) providing an electrode active material according to general formula $Li_{1+x}TM_{1-x}O_2$, wherein TM is selected from Ni and, optionally, at least one of Co and Mn, and, optionally, at least one element selected from Al, Mg, and Ba, transition metals other than Ni, Co, and Mn, and x ranges from zero to 0.2, wherein at least 50 mole-% of the transition metal of TM is Ni,
   (b) treating the electrode active material with an aqueous medium,
   (c) partially removing water by solid-liquid separation method, thereby obtaining a moisture-containing solid residue, (d) treating the moisture-containing solid residue from step (c) with an aqueous formulation of at least one heteropoly acid or its respective ammonium or lithium salt, thereby obtaining a material, and (e) treating the material obtained in step (d) thermally.

2. The process according to claim 1, wherein TM is a combination of metals according to general formula (I)

$$(Ni_aCo_bMn_c)_{1-d}M^1_d \qquad \text{(I)}$$

wherein a ranges from 0.6 to 0.99, b is zero or ranges from 0.01 to 0.2, c ranges from zero to 0.2, and d ranges from zero to 0.1, $M^1$ is at least one of Al, Mg, Ti, Nb, Mo, W and Zr, and a+b+c=1.

3. The process according to claim 1, wherein $M^1$ is Al.

4. The process according to claim 1, wherein step (c) is performed by filtration or with a centrifuge.

5. The process according to claim 1, wherein the aqueous medium in step (b) is water.

6. The process according to claim 1, wherein from step (c), a moisture-containing filter cake is obtained.

7. The process according to claim 1, wherein the heteropoly acid is selected from phosphotungstic acid, phosphomolybdic acid, tungstosilicic acid, molybdosilicic acid, and their respective ammonium and lithium salts.

8. The process according to claim 1, wherein the amount of heteropoly acid ranges from 0.05 to 1.5 mol-%, of a total TM.

9. The process according to claim 1, wherein step (e) comprises a calcination step at a maximum temperature in a range of from 300° C. to 700° C.

10. The process according to claim 1, wherein step (e) comprises a drying step at a maximum temperature in a range of from 40° C. to 250° C.

11. The process according to claim 1, wherein TM is selected from $Ni_{0.6}Co_{0.2}Mn_{0.2}$, $Ni_{0.7}Co_{0.2}Mn_{0.1}$, $Ni_{0.8}Co_{0.1}Mn_{0.1}$, $Ni_{0.83}Co_{0.12}Mn_{0.05}$, $Ni_{0.88}Co_{0.055}Al_{0.055}$, $Ni_{0.9}Co_{0.045}Al_{0.045}$, and $Ni_{0.85}Co_{0.1}Mn_{0.05}$.

12. The process according to claim 1, wherein in step (b), an amount of water in the aqueous medium and an amount of electrode active material have a weight ratio ranging from 1:5 to 5:1.

* * * * *